United States Patent
Belous

[19]

[11] Patent Number: 6,074,195
[45] Date of Patent: Jun. 13, 2000

[54] HOT RUNNER NOZZLE WITH LAMINAR FLOW PIN POINT TIP

[75] Inventor: Eduardo L. Belous, Roselle, Ill.

[73] Assignee: Fast Heat, Inc., Elmhurst, Ill.

[21] Appl. No.: 09/206,333

[22] Filed: Dec. 8, 1998

[51] Int. Cl.$^7$ .................................................. B29C 45/20
[52] U.S. Cl. ..................................... 425/549; 264/328.15
[58] Field of Search ........................ 425/549; 264/328.15

[56] References Cited

U.S. PATENT DOCUMENTS

| | | | |
|---|---|---|---|
| 4,312,630 | 1/1982 | Travaglini | 425/549 |
| 4,786,246 | 11/1988 | Gellert | 425/549 |
| 5,871,786 | 2/1999 | Hume et al. | 425/549 |
| 5,879,727 | 3/1999 | Puri | 425/549 |
| 6,022,210 | 2/2000 | Gunther | 425/549 |

*Primary Examiner*—Tim Heitbrink
*Attorney, Agent, or Firm*—Leydig, Voit & Mayer, Ltd.

[57] ABSTRACT

A hot runner nozzle for heating and directing a melt stream to a mold cavity. The nozzle includes a heated nozzle body having a longitudinal flow passageway with a tapered tip at a downstream end thereof. The tip has a plurality of internal transition passageways communicating between said longitudinal passageway outwardly through a side of the tip. The tip is formed with a plurality of external laminar flow passageways each communicating with a respective internal tip passageway and extending longitudinally in a downstream direction along the tapered tip for imparting a laminar flow to the melt stream as it approaches and is directed through the mold cavity gate.

20 Claims, 1 Drawing Sheet

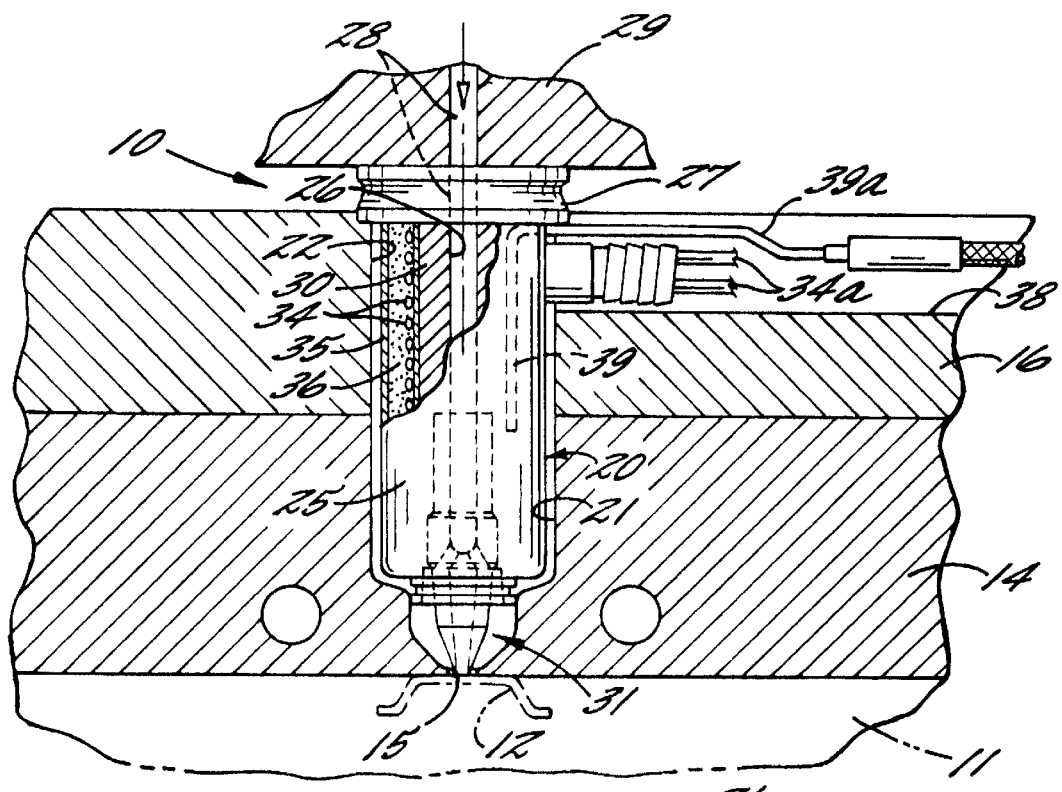
Fig. 1.
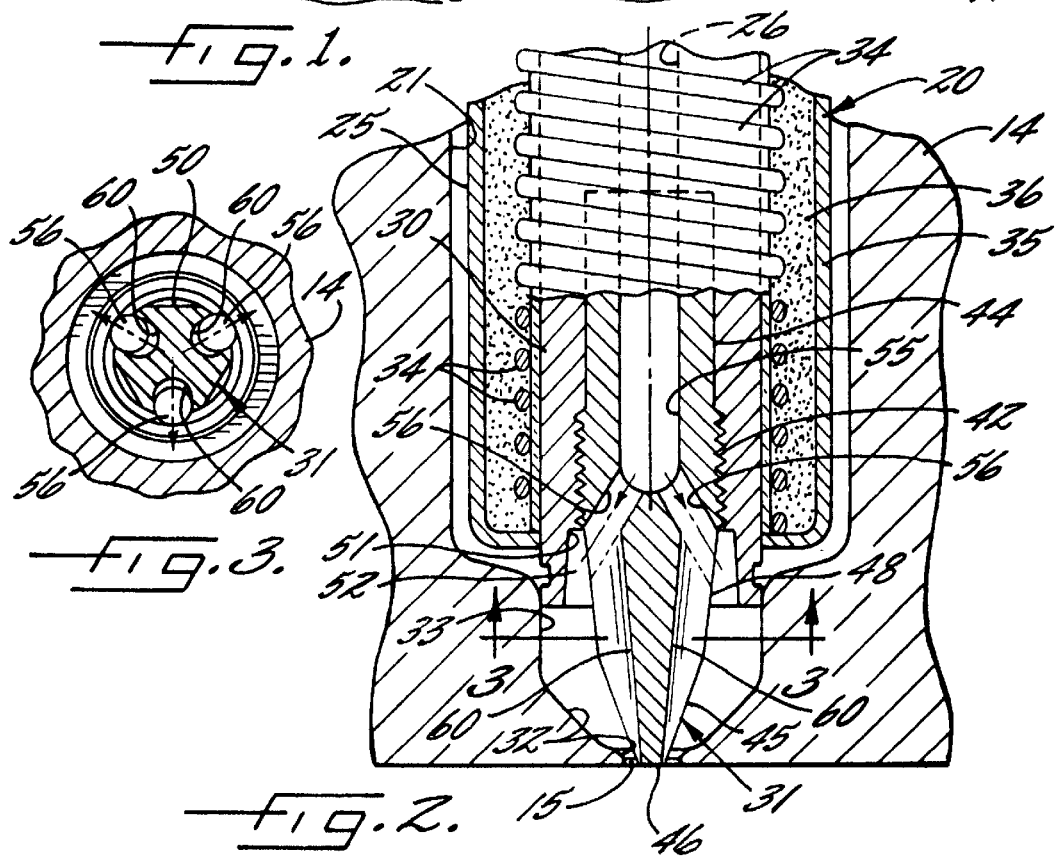
Fig. 2.
Fig. 3.

HOT RUNNER NOZZLE WITH LAMINAR FLOW PIN POINT TIP

FIELD OF THE INVETION

The present invention relates generally to injection molding apparatus, and more particularly, to a hot runner nozzle with a pin point tip for receiving a flow stream, such as molten plastic from an injection machine, and for directing the flow stream through a gate into a mold while maintaining the flow stream at proper temperature.

BACKGROUND OF THE INVENTION

Hot runner nozzles used in injection molding systems commonly have a tapered generally pointed tip at the downstream end, sometimes referred to as a pin point tip, which is concentrically disposed with respect to the mold gate for heating the melt stream and facilitating direction of the melt stream through the gate into the mold cavity. As the flow stream approaches and is directed through the gate, substantial turbulence can be imparted to the melt stream. Such turbulence, which typically results in a forceful circular movement of the fluid material about the nozzle tip, can create significant wear to the tip, necessitating periodic shut down and tip replacement. When the fluid flow stream includes glass fibers or other abrasive or reinforcing material, turbulent induced wear is escalated.

To compensate for such wear, heretofore the tips of such hot runner nozzles have been made of relatively hard materials, such as carbide, which substantially increases cost. Moreover, such hard materials can be very brittle and incur cracking or fracture from vibratory forces incurred during the molding operation, resulting in malfunction, mold shut down, and costly repair and replacement.

OBJECTS AND SUMMARY OF THE INVENTION

It is an object of the present invention to provide a hot runner nozzle having a pin point tip that is less susceptible to wear.

Another object is to provide a hot runner nozzle as characterized above with a pin point tip that effectively reduces wear causing turbulence in the melt stream as it enters the mold gate.

A further object is to provide a hot runner nozzle of the above kind in which the pin point tip can be made of softer, less costly material.

Yet another object is to provide a hot runner nozzle of the foregoing type that is relatively simple in design and lends itself to economical manufacture and long-term reliable usage.

Other objects and advantages of the invention will become apparent upon reading the following detailed description and upon reference to the drawings, in which:

BRIEF DESCRIPTION OF THE DRAWINGS

FIG. 1 is a vertical section of an injection molding apparatus having a hot runner nozzle in accordance with the invention;

FIG. 2 is an enlarged fragmentary section of the downstream end of the hot runner nozzle shown in FIG. 1; and FIG. 3 is a fragmentary section of the pin point tip of the illustrated nozzle, taken in the plane of line 3—3 in FIG. 2.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Referring now more particularly to the drawings, there is shown an illustrative plastic injection molding apparatus 10 comprising a conventional mold cavity plate 11 defining a mold cavity 12, gate plate 14 disposed immediately above the mold cavity plate 11 defining an inwardly converging gate 15 to the mold cavity 12, and a manifold or retainer plate 16 disposed above the gate plate 11. For directing a melt stream, such as fluid plastic material from a supply source such as an injection molding machine, to the valve gate 15, a hot runner nozzle 20 is mounted within aligned cylindrical apertures 21, 22 in the manifold plate 16 and gate plate 14. The hot runner nozzle 20 comprises a cylindrical body portion 25 having an axial flow passage 26 communicating with a flow passageway 28 in an end cap 27 and inlet plate 29. The axial passage 26 in this case extends longitudinally through a central cylindrical core 30 of the nozzle body 25 to a pin point tip 31 at the downstream end of the body 25 concentrically supported with respect to the mold 15. The mold gate 15 is defined by conically tapered side walls 32, having an upper cylindrical wall section 33, which define an annular space about the downstream end of the pin point tip 31.

For heating the melt stream during its travel through the axial passage 26 of the nozzle body 25, the nozzle includes appropriate longitudinally extending electrically heating means. The illustrated nozzle body 25 includes an electrical resistance heating element 34 helically wound around the cylindrical core 30, which preferably is made of ceramic. The core 30 and electrical heating element 34 are disposed within a cylindrical bore of an outer shell 35, preferably made of metal, with an electrically insulative powder 36, such as magnesium oxide, interposed between the core 30 and metallic shell 35 in surrounding relation about the heating element 34. To compress the powder 36 and fill all voids around the heating element 34 for efficient thermal conductivity and for securing the shell 35, heating element 34, powder 36, and core 30 in an integral unit, the shell 35 preferably is swedged by rolling or the like to compress and reduce its diameter.

For connecting the electrical resistance heating element 34 to an electrical power source, the heating element 34 has leads 34a extending radially through an upper end of the shell 35 and into a passage 38 of the manifold plate 16. In order to sense the temperature of the core 30, a thermocouple 39 extends between the core 30 and shell 35 to a point approximately midway the axial length of the nozzle and has an upstream lead 39a extending from the nozzle shell 35 at a location adjacent the heating element leads 34a.

The pin point nozzle tip 31, as best depicted in FIG. 2, in this instance is a separate member having an externally threaded neck 42 screwed into an internally threaded bore in the downstream end of the core 30. To enhance thermal conductivity between the core 30 and tip 31, the illustrated tip has an uppermost cylindrical end 44 above the threaded neck 42 disposed in close fitting relation within a counterbore of the core 30. Integral with the lower end of the nozzle tip 31, is a terminal tip portion 45 which is frusto-conical in shape, having a flattened end 46 substantially co-planar with the interface between the mold and gate plates 11, 14. The terminal tip portion 45 is connected to the neck 42 by a downwardly and inwardly tapered section 48 having a conical angle less than that of the terminal tip portion 45. The tapered section 48 in this instance is formed with a pair of diametrically opposed flats 50 (FIG. 3) to facilitate engagement by a wrench for screwing the nozzle tip 31 into and out of the core 30. The downstream end of the illustrated core 30 is formed with an upwardly and inwardly extending frusto-conical counterbore 51 for defining an annular space 52 about an upper portion of the tapered tip section 48.

For communicating the melt stream from the axial flow passageway 26 of the core 30 through and out of the nozzle tip 31, the nozzle tip 31 has an axial passageway 55 in communication with the axial core passageway 26 which extends through the cylindrical portion 44 and threaded neck 42 of the tip 31. A plurality of equally spaced transition or exit passageways 56, in this case three in number, extend in outwardly angled fashion with respect to the longitudinal axis of the nozzle from the axial tip passageway 55 through the tapered nozzle tip section 48.

In accordance with an important aspect of the invention, each exit or transition passageway communicates with a respective external axial groove or passageway in the nozzle tip which receives and directs the melt stream in an axial direction for imparting a laminar flow in the melt stream to the mold gate in order to minimize wear creating turbulence in the melt stream in the vicinity of the nozzle tip and gate. To this end, the illustrated tip 31 is formed with three laminar flow passageways 60 each having an outwardly opening generally U-shaped cross section which extend from the exit or discharge end of a respective transition passageway 56 in downward and inwardly tapered fashion through the tapered section 48 and the terminal tip portion 45 of the nozzle tip 31. By virtue of the inward tapered configuration of the terminal tip portion 45, the laminar flow passageways 60 become shallower in depth as they approach the end of the tip 31.

In operation, it will be understood by one skilled in the art that a melt stream can be directed from an injection machine into and through the axial flow passage 26 of the hot runner nozzle 20 where it is maintained to the proper temperature by the heating element 34. The melt stream in the axial passage 26 will separate into three separate flow streams as it enters the transition passageways 56. As the divided and separate melt streams exit the transition passageways 56 into the respective laminar flow passages 60, the streams are guided by the groove-like passages 60 in an axial direction, which imparts a laminar flow to the melt stream as it proceeds into and through the mold gate 15, which unexpectedly has been found to substantially reduce turbulence in the flow stream and wear to the tip 31. As a result, the nozzle can be used for substantially greater periods of time, without costly shut down and repair and replacement of the tip. Notwithstanding such laminar flow, it has been found that the melt stream nevertheless can be injected into the mold cavity with sufficient force and turbulence within the mold cavity 12 for reliable, quality molding.

From the foregoing, therefore, it can be seen that the hot runner nozzle of the present invention has a pin point tip that substantially reduces wear causing turbulence in the fluid flow stream as it is directed to and enters a mold gate. As a result, the tip may be made of softer, less costly materials than presently required in such injection molding equipment, particularly when the melt stream includes fiberglass or other abrasive or reinforcing materials. The pin point tip, furthermore, is a relatively simple design and lends itself to economical manufacture and long term reliable usage.

What is claimed is:

1. A hot runner nozzle for heating and directing fluid material of a melt stream to a mold cavity gate comprising a nozzle body having a longitudinal passageway for receiving said melt stream at an upstream thereof for direction through said axial passageway, said nozzle body having a heating element for heating said melt stream during passage through said longitudinal passageway, a tip at a downstream end of the said body, said tip having at least one internal passageway communicating from said longitudinal passageway outwardly through a side of said tip, and said tip having at least one external outwardly opening passageway communicating with said internal tip passageway and extending longitudinally in a downstream direction along said tip for receiving fluid material directed through said longitudinal passageway and internal tip passageway and for imparting a laminar flow to the material as it is directed to a mold cavity gate.

2. The hot runner nozzle of claim 1 in which said tip is formed with a plurality of internal passageways which each are in communication with the longitudinal body passageway and which communicate through a side of said tip, and said tip being formed with a plurality of said external longitudinally extending passageways each communicating with a respective one of said internal tip passageways.

3. The hot runner nozzle of claim 2 in which said external passageways each have an outwardly opening U-shaped cross section.

4. The hot runner nozzle of claim 1 in which said internal tip passageway includes an axial passage communicating at an upstream end with said longitudinal body passageway and at least one transition passageway communicating at an upstream end with that axial tip passage and extending at an angle thereto outwardly through a side of said tip.

5. The hot runner nozzle of claim 4 in which said tip is formed with a plurality of said transition passageways each communicating at an upstream end with said axial tip passage and extending outwardly at an angle thereto through a side of said tip, and said tip being formed with a plurality of said external longitudinal passageways each communicating with a respective one of said transition passageways and extending longitudinally in a downstream direction therefrom.

6. The hot runner nozzle of claim 5 in which said tip has three transition passageways communicating respectively with three external longitudinal passageways, and said external longitudinal passageways each being disposed at equal circumferentially spaced locations about said tip.

7. The hot runner nozzle of claim 2 in which said tip ha s an inwardly tapered end and said external longitudinal passages extend downwardly and inwardly along said tapered end.

8. The hot runner nozzle of claim 7 in which said tip has a frusto conical terminal end portion.

9. The hot runner nozzle of claim 8 in which said tip has an inwardly tapered section upstream of said terminal end portion, said tapered section having a smaller angle of taper to the longitudinal axis than said terminal end portion.

10. The hot runner nozzle of claim 9 in which said internal tip passageways extend through said tapered section, and said external passageways extend longitudinally through said tapered section and terminal end portion of said tip.

11. The hot runner nozzle of claim 1 in which said body includes an inner cylindrical core through which said axial passageway extends, and said tip being a separate part secured to a downstream end of said body.

12. The hot runner nozzle of claim 11 in which said core is formed with a counter bore in a downstream end thereof which defines an annular air space about said tip.

13. The hot runner nozzle of claim 11 in which said body includes an outer cylindrical shell within which said core is supported, said heating element comprising electrical resistance heating element wound about said core, and dielectric powder disposed between said core and shell in tightly compacted relation about said electrical resistance heating element.

14. An injection molding apparatus comprising at least one plate defining a mold cavity gate, a hot runner nozzle supported within said plate for heating and directing fluid material of a melt stream from a supply to said mold cavity gate, said nozzle having a core formed with a longitudinal passageway for receiving said melt stream at an upstream end thereof for direction through said axial passageway, an electrical heating element for heating said core and the melt stream directed through said axial passageway, a tip at a downstream end of said body disposed in predetermined relation to said gate, said tip having at least one internal passageway communicating from said longitudinal core passageway outwardly through a side of said tip, and said tip having at least one external outwardly opening passageway communicating with said internal tip passageway and extending longitudinally in a downstream direction along said tip for receiving fluid material directed through said longitudinal core passageway and internal tip passageway and for imparting a laminar flow to such fluid material as it is directed to a mold cavity gate.

15. The apparatus of claim 14 in which said tip is formed with a plurality of internal passageways which each are in communication with the longitudinal core passageway and which communicate through a side of said tip, and said tip being formed with a plurality of said external longitudinally extending passageways each communicating with a respective one of said internal tip passageways.

16. The apparatus of claim 15 in which said external passageways each have an outwardly opening U-shaped cross section.

17. The apparatus of claim 16 in which said internal tip passageway includes an axial passage communicating at an upstream end with said longitudinal body passageway and at least one transition passageway communicating at an upstream end with that axial tip passage and extending at an angle thereto outwardly through a side of said tip.

18. The apparatus of claim 17 in which said tip is formed with a plurality of said transition passageways each communicating at an upstream end with said axial tip passage and extending outwardly at an angle thereto through a side of said tip, and said tip being formed with a plurality of said external longitudinal passageways each communicating with a respective one of said transition passageways and extending longitudinally in a downstream direction therefrom.

19. The apparatus of claim 14 in which said tip has an inwardly tapered end and said external longitudinal passages extend downwardly and inwardly along said tapered end.

20. The apparatus of claim 14 in which said core is formed with a counter bore in a downstream end thereof which defines an annular air space about said tip.

* * * * *